Aug. 28, 1962 W. D. BROWN 3,050,881
TRENCHING MACHINE CUTTER MECHANISM
Filed April 19, 1961 2 Sheets-Sheet 1
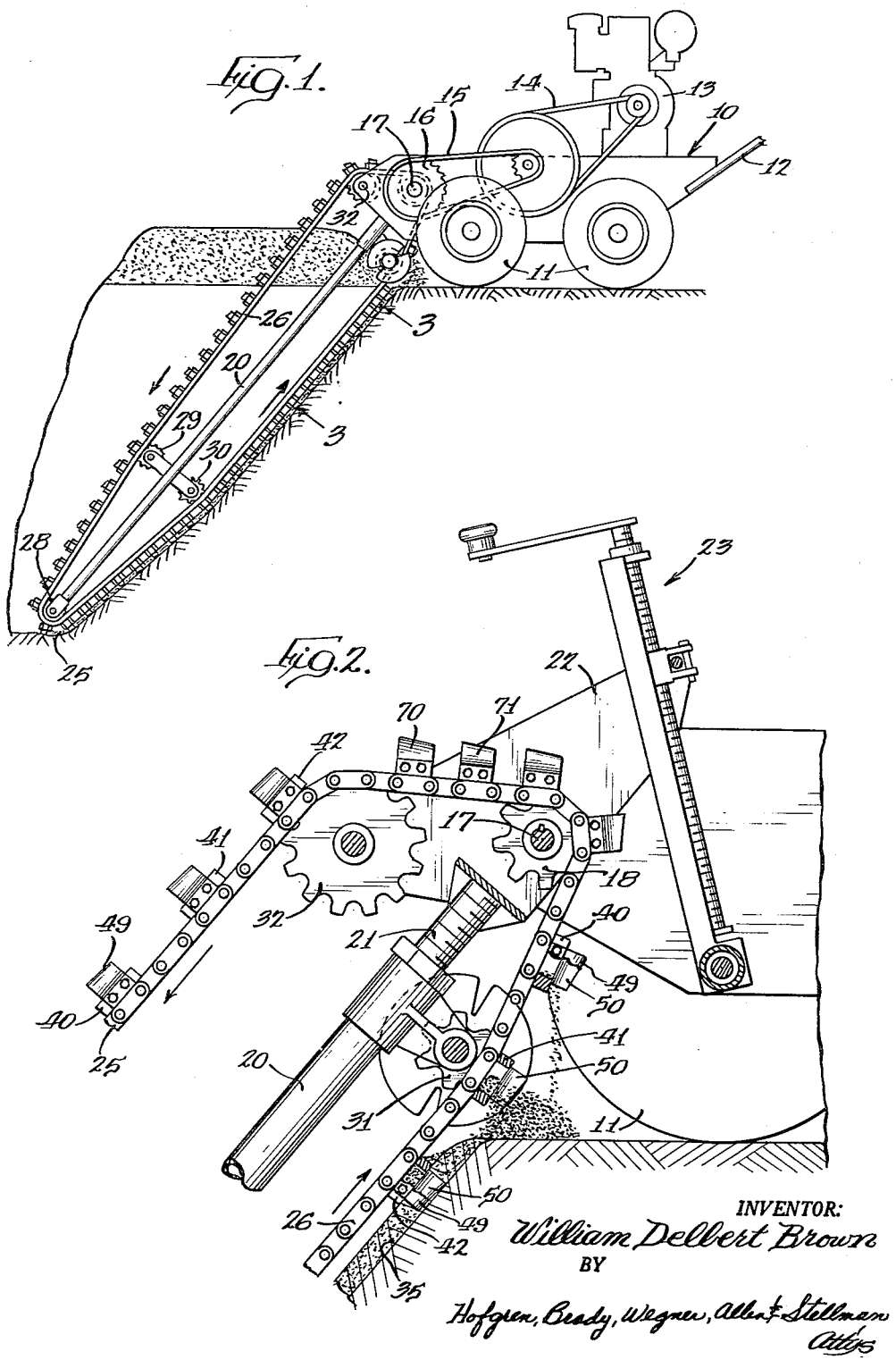
INVENTOR:
William Delbert Brown
BY
Hofgren, Brady, Wegner, Allen & Stellman
Attys Aug. 28, 1962  W. D. BROWN  3,050,881
TRENCHING MACHINE CUTTER MECHANISM
Filed April 19, 1961  2 Sheets-Sheet 2
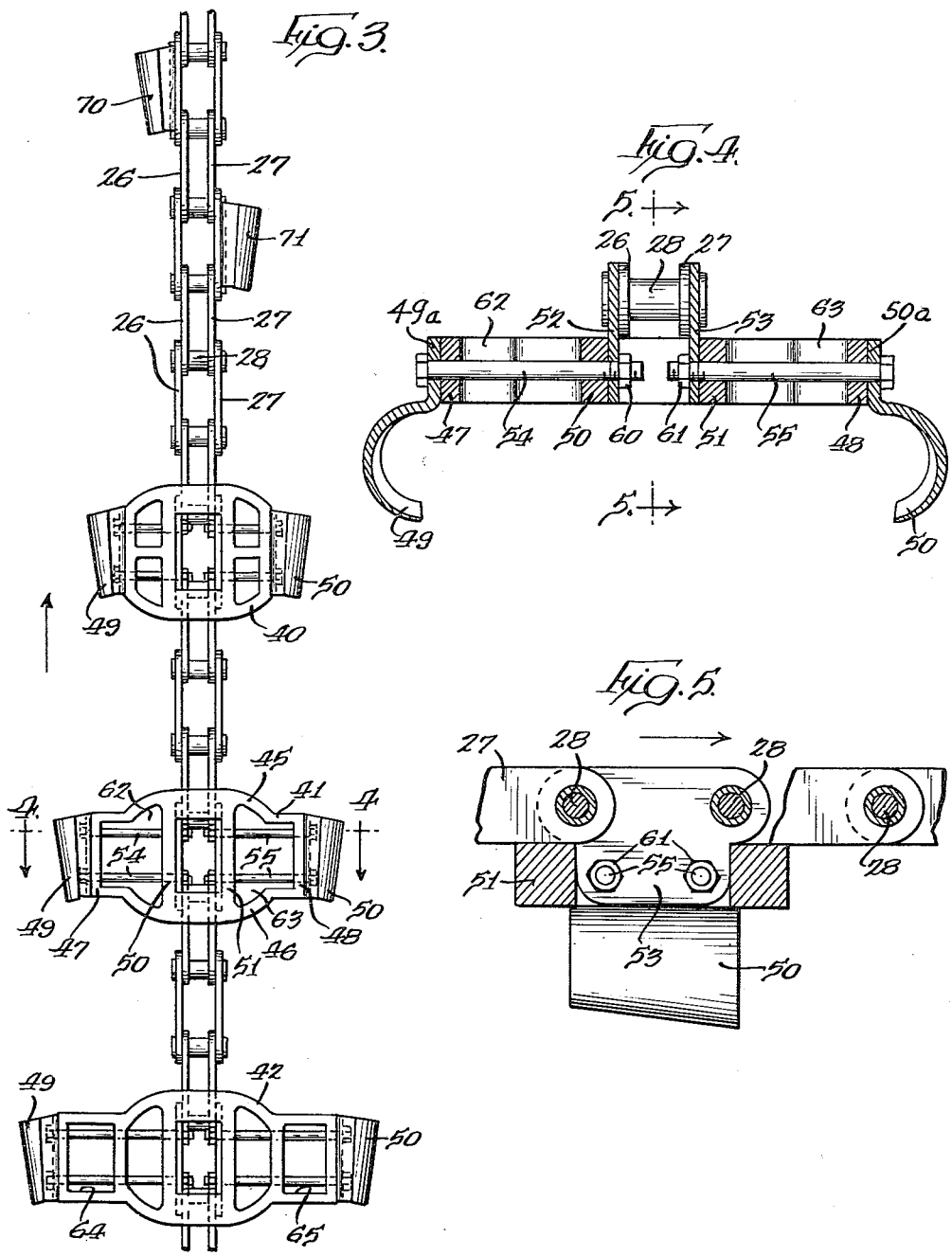

United States Patent Office 3,050,881
Patented Aug. 28, 1962

3,050,881
TRENCHING MACHINE CUTTER MECHANISM
William Delbert Brown, Woodbine, Iowa
Filed Apr. 19, 1961, Ser. No. 104,042
7 Claims. (Cl. 37—86)

This invention relates to a trenching machine and more particularly to a cutting mechanism therefor having earth conveying means associated therewith.

An object of this invention is to provide new and improved trench cutting mechanism for simply conveying earth or the like from the trench during cutting thereof.

Another object of the invention is to provide cutting mechanism for a trenching machine in which an endless member movable along the trench in a cutting operation carries one or more brackets of a skeleton type, each of which support cutters for cutting the earth and in which the brackets have one or more pockets with open tops and bottoms for receiving earth into the pocket which is held therein by the bracket travelling along the base of the trench and is discharged from the pocket through the bottom thereof when the bracket travels to a level above the top of the trench whereby the earth is left at ground surface without any further conveying thereof and without any complex mechanism for causing discharge of the earth from the pockets.

Further objects and advantages will become apparent from the following detailed description taken in connection with the accompanying drawings in which:

FIG. 1 is a side elevational view of a trenching machine showing the cutting mechanism in operation cutting a trench in the earth or the like;

FIG. 2 is an enlarged fragmentary vertical section taken through the trenching machine from front to rear thereof and showing the earth conveying operation in more detail;

FIG. 3 is a fragmentary bottom view of the cutting mechanism taken generally along the line 3—3 in FIG. 1;

FIG. 4 is a sectional view taken generally along the line 4—4 in FIG. 3; and

FIG. 5 is a fragmentary vertical section taken generally along the line 5—5 in FIG. 4.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The trenching machine disclosed herein is of the type disclosed in my Patent No. 2,828,557, granted April 1, 1958, to which reference may be made for a detailed understanding of the trenching machine; however, general reference is made herein to the machine for an overall understanding of the mechanism.

The trenching machine has a frame indicated generally at 10, supported on the surface of the ground by a plurality of wheels 11 and has handle means 12 extending from an end thereof. The frame 10 mounts a power source in the form of a motor 13 which through a drive transmission system including belts 14 and 15 drives a sprocket 16 fixed to a shaft 17 which, as shown in FIG. 2, has a sprocket 18 centrally located thereon. The drive sprocket 18 provides a power source for the cutting mechanism described more fully hereinafter.

The cutting mechanism embodies a boom 20 mounted on a stub shaft 21 affixed to plate means 22 pivotal on the shaft 17. With this pivotal mounting, the boom 20 may be moved between various trench cutting positions with one being shown in FIGS. 1 and 2 and an elevated position above the ground surface. These adjustment movements are accomplished by means of a manual adjustment mechanism indicated generally at 23.

The cutting mechanism further includes an endless member in the form of an endless chain 25 which, as shown in FIG. 3, embodies a series of pairs of links 26 and 27 with one pair being connected to an adjacent pair by a pin 28. The chain is guided in a path of movement by idler sprockets 28, 29, 30 and 31 mounted on the boom with an additional idler sprocket 32 being mounted on the adjusting plate means 22. Thus with the cutting mechanism disposed in trench cutting position as shown in FIGS. 1 and 2, the chain travels in upper and lower paths with the lower path having the chain travelling upwardly adjacent to a base 35 of the trench.

It is now standard practice to mount a plurality of cutters on the chain for cutting of a trench with a quick detachment and attachment arrangement therefor being disclosed in my pending application, Serial No. 2,146, now Patent No. 3,022,588, filed January 13, 1960. In order to cut trenches of substantial width a limitation has been in the removal of earth from the trench due to the increased quantity thereof in the wider trench being cut. In the invention disclosed herein, this problem has been overcome by inexpensive devices which also serve as mounting members for the cutters and which form pockets for the earth. The pockets function to convey the earth to the top of the trench and merely by the devices leaving the trench permit the earth to fall from the pockets while the devices continue to travel with the chain. It is not required that the devices move or turn in order to release the earth.

As shown in FIGS. 2 to 5, three of these devices are arranged in sequence on the chain, with these devices in the form of brackets being indicated at 40, 41 and 42. These brackets are progressively longer with the bracket 42 having a length substantially equal to the desired width of the trench and it will be obvious that a lesser number of brackets are used in the sequence or a single bracket 40 can be used with the number being determined by the desired width of trench. Each of the brackets are similar, with particular reference being made to the bracket 41 shown in FIGS. 4 and 5, as well as FIG. 3. The bracket 41 has a generally skeleton-type construction with a front wall 45 and a rear wall 46 forming leading and trailing surfaces and interconnecting wall sections 47 and 48 providing mounting surfaces for a pair of opposed cutters 49 and 50 having mounting flanges 49a and 50a, respectively, as shown in FIG. 4. The bracket has a pair of integral brace members 50 and 51 extending between the front and rear walls 45 and 46. As shown in FIG. 4, the bracket is attached to the chain and, particularly, to depending parts 52 and 53 of a pair of links by two pairs of bolts 54 and 55 which pass through suitable openings in the flanges of the cutters 49 and 50 as well as openings in the bracket sections 47, 48, 50 and 51 and the depending link sections 52 and 53 to mount the cutters to the bracket and the bracket to the chain. The bolts are held in place by nuts 60 and 61 threaded thereon. The skeleton type of construction of the bracket 41 results in providing a pair of earth receiving pockets indicated at 62 and 63, each of which have open tops and bottoms whereby as will be evident from the showing of FIG. 2 earth being cut may fall into the pockets through the open tops thereof. This earth is retained in the pockets by the brackets travelling along the base 35 of the trench or more specifically travelling along a relatively loose layer of earth which in effect forms a temporary bottom for the pocket. Once the particular bracket has travelled above the trench, the earth is free to fall from the pockets as is shown in FIG. 2. It will be seen that the construction of the bracket 40 shown in FIG. 3 is substantially the same as the bracket 41 as is the bracket 42, however, the latter bracket, due to its increased length, has provision for an additional pair of pockets 64 and 65 defined by the wall structure of the bracket.

Additional cutters are shown in FIGS. 2 and 3 carried on the chain but without the use of a bracket such as bracket 41 with these cutters being indicated at 70 and 71 and functioning to make the initial cut in the trench. These cutters are located at the same elevation with respect to the chain as the cutters carried on the brackets by being attached to depending portions 53 of the links. It will be evident from FIG. 2 that the sequence of brackets 40, 41 and 42 is repeated several times along the length of the chain.

I claim:

1. In a trenching machine having a frame, a trench forming mechanism comprising a movable boom extending from the frame, an endless cutter chain mounted on the boom for travel in lower and upper paths whereby in a trenching operation the chain in the lower path travels upwardly, a plurality of cutters carried by the chain and lying at opposite sides thereof to cut earth and the like and means for increasing the space between an opposed pair of cutters including a bracket secured to the chain and extending beyond opposite sides thereof with lateral surfaces at the ends thereof, means mounting said opposed pair of cutters on said bracket lateral surfaces with their cutting edges adjacent the bracket, and means defining at least one pocket in said bracket at the side of the chain having closed sides and an open top and bottom whereby earth or the like can be received within the pocket and conveyed by the bracket to a level above the trench whereby further elevation of the bracket causes the dirt to discharge from the pocket from the bottom thereof.

2. In a trenching machine as defined in claim 1 in which a plurality of said brackets are mounted on said chain with each bracket mounting at least one pair of opposed cutters.

3. In a trenching machine as defined in claim 2 in which said brackets have a variety of lengths arranged in sequence from short to long and with the volume of the pockets increasing correspondingly to progressively cut the trench to the desired width and convey the earth or the like to the discharge location as part of the operation.

4. A cutting mechanism for a trenching machine comprising, an endless chain having a plurality of links interconnected by pins, a cutter bracket attached to an opposed pair of links and spaced from the transverse plane of the chain, said bracket having a length substantially equal to the width of the trench desired and having outboard ends, a pair of cutters carried one at each end of said bracket with their cutting edges adjacent the bracket whereby as the cutters are cutting the bracket lies beneath the chain, and a pair of pockets within the bracket at either side of the chain having open bottoms for carrying earth and the like to the surface above the trench and discharging the earth from said open bottom, each of said cutters being attached to said outboard ends of the bracket.

5. A cutting mechanism as defined in claim 4 in which there are a plurality of said brackets of different length arranged in sequence along said chain with the bracket having a length substantially equal to the width of the trench being the last in the sequence.

6. A cutting mechanism for a trenching machine comprising, an endless member movable in a path, a block-like cutter bracket attached to said endless member and having a height dimension at a side of the chain sufficient to form a pocket of substantial earth carrying capacity with outboard ends of said bracket having lateral surfaces lying outboard of said chain, a pair of cutters each having a mounting flange secured one to each of said bracket outboard end lateral surfaces, and means defining a pocket within the bracket having an open top and an open bottom whereby earth and the like may fall into the pocket through the top thereof with the earth being held in the pocket by the bracket traveling along the base of the trench being cut and earth is discharged from the pocket through the bottom thereof when the bracket leaves the base of the trench.

7. In a trenching machine having a frame, a trench forming mechanism comprising a movable boom extending from the frame, an endless cutter chain mounted on the boom for travel in lower and upper paths whereby in a trenching operation the chain in the lower path travels upwardly, a plurality of cutters carried by the chain and lying at opposite sides thereof to cut earth and the like and means for increasing the space between an opposed pair of cutters including a bracket secured to the chain and extending beyond opposite sides thereof, means mounting said opposed pairs of cutters on said bracket with their cutting edges immediately adjacent the bracket, said bracket being of the skeleton type having a perimeter wall including leading and trailing sections and interconnecting sections, said interconnecting sections engaging and mounting said cutters, internal bracing sections spaced from the interconnecting sections and extending between the leading and trailing sections and attached to the chain, whereby the remaining spaces between the sections define pockets having open tops and bottoms for conveying the earth and the like out of the trench.

References Cited in the file of this patent
UNITED STATES PATENTS
2,666,273     McIninch _____ Jan. 19, 1954